Figure 3:
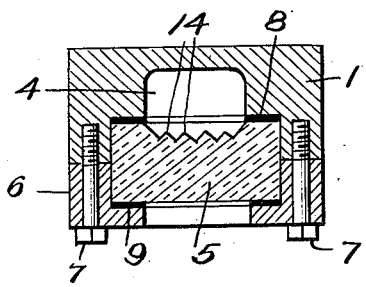

March 25, 1924.
G. D. MACBETH
GAUGE COVER
Filed April 21, 1923   2 Sheets-Sheet 1
1,488,403
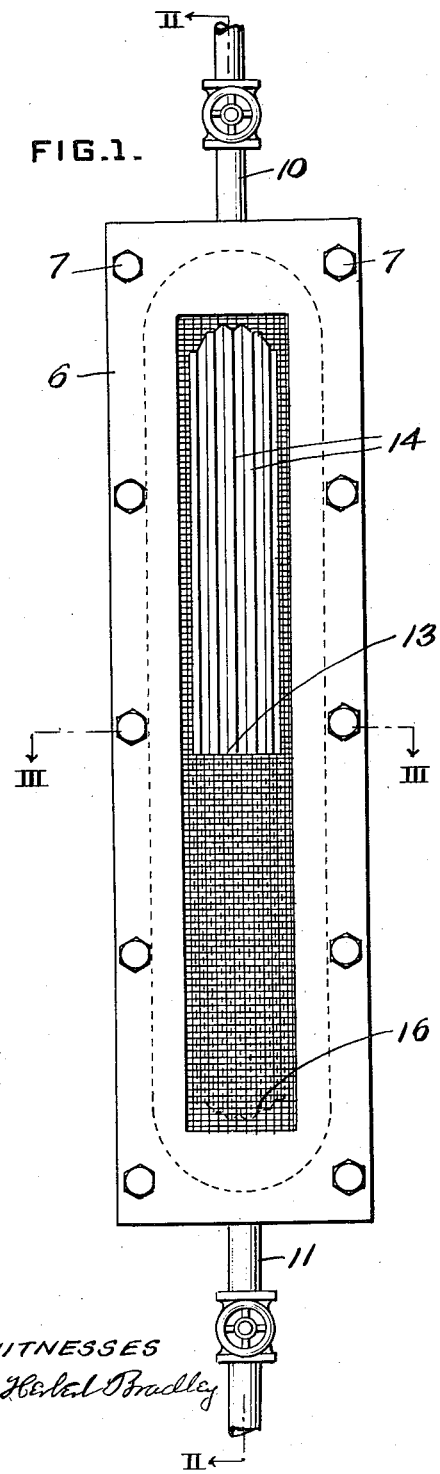
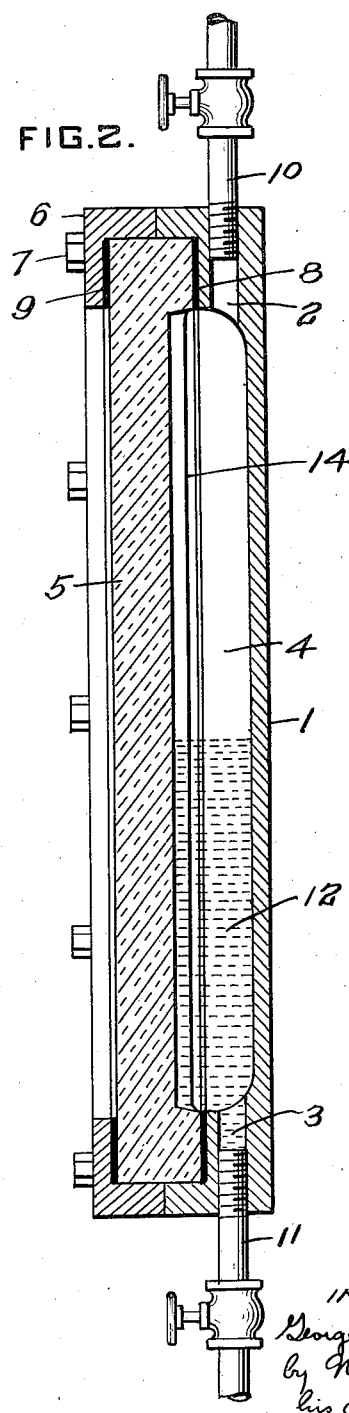
WITNESSES
J. Herbert Bradley
INVENTOR
George D. Macbeth,
by Winter + Brown,
his attorneys, March 25, 1924.    G. D. MACBETH    1,488,403
GAUGE COVER
Filed April 21, 1923    2 Sheets-Sheet 2

WITNESSES
J. Herbert Bradley

INVENTOR
George D. Macbeth,
by Winter & Brown,
his attorneys.

Patented Mar. 25, 1924.

1,488,403

UNITED STATES PATENT OFFICE.

GEORGE D. MACBETH, OF PITTSBURGH, PENNSYLVANIA, ASSIGNOR TO MACBETH-EVANS GLASS COMPANY, OF PITTSBURGH, PENNSYLVANIA, A CORPORATION OF PENNSYLVANIA.

GAUGE COVER.

Application filed April 21, 1923. Serial No. 633,713.

*To all whom it may concern:*

Be it known that I, GEORGE D. MACBETH, a citizen of the United States, and a resident of Pittsburgh, Pennsylvania, in the county of Allegheny and State of Pennsylvania, have invented a new and useful Improvement in Gauge Covers, of which the following is a specification.

The invention relates to covers for liquid level gauges of the type commonly used to indicate the water level in liquid containers such as tanks, reservoirs, boilers and the like.

Gauges of the particular type herein contemplated comprise a metal casing and a transparent cover, usually of glass, clamped to it. Between the metal casing and the rear face of the cover there is a chamber which is placed in communication with the liquid container through suitable openings formed usually in the ends of the metal casing. A portion of the rear face of the gauge cover is provided with what is commonly known as a totally reflecting surface which, when backed with a medium of small index of refraction such as air or steam or other gases or vapors, reflects the light striking it, and by reason thereof appears brilliant when viewed from proper positions. However, when backed by a liquid medium such as water, the reflecting surface does not reflect the light, but, on the contrary, appears dark. Due to this, the portion of the gauge chamber occupied by liquid appears dark, the portion occupied by air or steam appears brilliant in contrast with the dark portion, and the liquid level is indicated by the horizontal line of division between the two.

As heretofore actually constructed, the totally reflecting portions of the faces of gauge covers have terminated in visually straight lines perpendicular to the longitudinal extent of the covers, that is to say in lines which are visually horizontal when the gauges are installed for use. When no liquid is in a gauge chamber having such a cover, the entire totally reflecting surface appears brilliant, the portion of the cover below such surface appears dark, and the line between the brilliant and dark areas being horizontal indicates a false liquid level. Furthermore, the totally reflecting portions of the faces have been formed of what are commonly known as totally reflecting prisms, the ends of each of which gradually taper to a point, which has resulted in an objectionable lack of sharpness in the water level indications at the lower end of the gauge. Due to the form of the terminations of the totally reflecting surfaces, explosions of steam-boilers have occurred because the engineers believed, when viewing the gauges, that water was in the boilers, whereas, in fact, the boilers had what proved to be disastrously small amounts of water in them.

The object of the invention is to provide a cover for liquid level gauges which will eliminate the possibility of a false or obscure liquid level being indicated.

The invention is illustrated in the accompanying drawings of which Fig. 1 is a face view of a complete gauge installed for use; Fig. 2 a vertical central sectional view taken on the line II—II, Fig. 1; Fig. 3 a horizontal sectional view taken on the line III—III, Fig. 1; Figs. 4, 5, 6 and 7 face views of the lower ends of gauge covers illustrating different embodiments of the invention; and Fig. 8 a transverse sectional view of a gauge cover illustrating a modification of construction.

As illustrative of the general type of gauges contemplated herein, that shown in the drawings comprises a casing 1 provided at its upper and lower ends with openings 2 and 3 and having a chamber 4 intermediate of the openings. An elongate cover 5 of transparent material having a totally reflecting surface on a portion of its rear face is clamped to casing 1 by means of a flanged frame member 6, through which bolts 7 extend into the casing. On each side of this cover, between it and casing 1 and clamping member 6, there are gaskets 8 and 9 which seal the gauge chamber 4 and form a cushion for the gauge cover. The openings 2 and 3 of the casing may be threaded for the attachment of pipes 10 and 11 which extend to the top and bottom portions of a liquid container with which the gauge is used.

In Fig. 2 a body of liquid 12 is indicated as filling the lower portion of chamber 4, and the appearance of the gauge cover due to its being backed in part by liquid and in part by steam or air above the liquid is indicated by the shading on Fig. 1. The darkly shaded portion of the cover is the part of the totally reflecting portion that is backed by liquid, and also the margin of the cover outside of the totally reflecting portion. The line 13, marking the upper limit of the main shaded portion, shows the liquid level. When liquid fills only a portion of the gauge chamber this line is always horizontal.

According to this invention the rear face of the gauge cover 5, that is to say, the face adjacent to gauge chamber 4, is provided with a totally reflecting portion having its lower end terminating abruptly in a line which, when no liquid is in the gauge chamber, cannot be confused with the horizontal line 13. For this purpose, the lower end of the totally reflecting portion terminates in a line which is visually non-coincident with a line lying in the general plane of such surface perpendicular to the longitudinal extent of the cover, or, stated differently, different parts of the totally reflecting portion of the surface visually terminate in different lines lying in the general plane of the reflecting portion and perpendicular to the longitudinal extent of the cover. As will presently be explained more in detail, the terminating line may have the appearance of being curved, straight or irregular.

Figure 7:
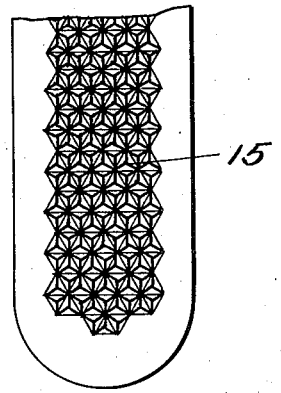
Figure 8:
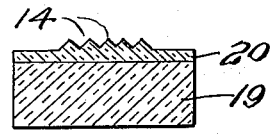

The totally reflecting portion of the surface is preferably formed of a plurality of parallel totally-reflecting abruptly-ending prisms 14 extending longitudinally of the gauge cover and inset in the manner shown in Fig. 3. However, the prisms may project outwardly as shown in Fig. 8, and the totally reflecting portion may be formed of rearwardly-projecting sharply-defined cube corners 15 as shown in Fig. 7. When the totally reflecting portion of the surface is formed by prisms 14 in the manner explained, their lower ends preferably so terminate as to appear as an outwardly extending curved line as indicated in Fig. 1 by the dotted line 16. That the gauge cover may be symmetrical and used either end lowermost, the totally reflecting portion of the surface preferably terminates the same at both ends.

Figure 6:
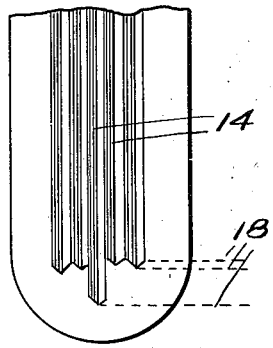
Figure 4:
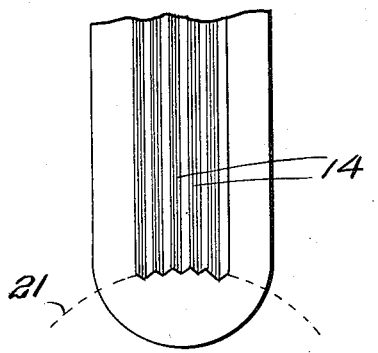
Figure 5:
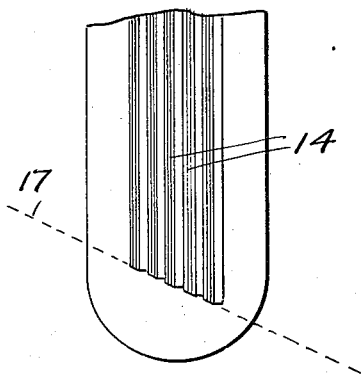

As illustrative of different manners of terminating the totally reflecting portion to avoid showing a false or obscure liquid level, the prisms are shown terminating so as to appear as an inwardly extending curved line 21 in Fig. 4, as a straight oblique line 17 in Fig. 5, and as an irregular line in Fig. 6. In Fig. 7, the reflecting portion terminates in the irregular line forming the lower boundary of the cube corners 15. In all cases different parts of the totally reflecting portion of the surface terminate abruptly in different lines visually lying in the general plane of such surface perpendicular to the longitudinal extent of the gauge cover and hence in a line which is visually not coincident with any one of such perpendicular lines. This is illustrated in Fig. 6 wherein the totally reflecting prisms 14 are indicated as terminating in different lines 18 visually lying in the general plane of the totally reflecting portion and perpendicular to the longitudinal extent of the gauge cover. Furthermore, in all cases the totally reflecting surfaces terminate abruptly, and hence their ends are sharply defined.

The gauge cover is preferably formed of a body of transparent glass, but may be formed of other transparent materials, such for example as celluloid, mica or bakelite, which are sufficiently strong and resistant to the chemical action and the temperature of the fluids that come in contact with them. Also, the gauge cover is preferably formed of a unitary body of a single material as shown in Fig. 3, but, as shown in Fig. 8, may be formed of several bodies of transparent material such as a body portion 19 of glass and a facing 20 of celluloid, or the like, on which the totally reflecting portion is formed.

When, in the use of the gauge cover, liquid partially fills the chamber 4, the level of the liquid is indicated by the horizontal line of division 13 in the same manner as heretofore. However, when no liquid is in the gauge chamber, the lower end of the brilliant total reflecting portion is indicated by a line which is sharply defined, and which, being other than horizontal, cannot be mistaken for a liquid level indication.

I claim:

1. A cover for a liquid level gauge, comprising an elongate body of transparent material having a totally reflecting portion on its rear surface terminating abruptly at its lower end in a line which is visually non-coincident with a line lying in the general plane of said surface perpendicular to the longitudinal extent of the cover, whereby the lower end of the totally reflecting portion of the rear surface is sharply defined in other than a horizontal line.

2. A cover for a liquid level gauge, comprising an elongate body of transparent material provided with a totally reflecting portion on its rear surface having at one end thereof different parts terminating abruptly at their lower ends in different lines visually lying in the general plane of the reflecting portion perpendicular to the longitudinal extent of the cover, whereby the lower end of the totally reflecting portion of said surface is sharply defined in other than a horizontal plane.

3. A cover for a liquid level gauge, comprising an elongate body of transparent glass provided on its rear face with a plurality of longitudinally extending totally reflecting prisms each terminating abruptly at the lower end of the cover in a line which is visually non-coincident with a line lying in the general plane of said surface perpendicular to the longitudinal extent of the cover, whereby the ends of the totally reflecting prisms are sharply defined in other than a horizontal line.

4. A cover for a liquid level gauge, comprising an elongate body of transparent glass provided on its rear face with a plurality of inset parallel totally reflecting prisms extending longitudinally of the cover, the ends of said prisms terminating abruptly in a visually curved line at each end of the cover.

In testimony whereof, I sign my name.

GEORGE D. MACBETH.

Witnesses:
HARRY S. HOWER,
PAUL N. CRITCHLOW.